Sept. 20, 1932.   W. F. GROENE   1,878,131
CRANK SHAFT LATHE
Filed Jan. 6, 1927   5 Sheets-Sheet 1
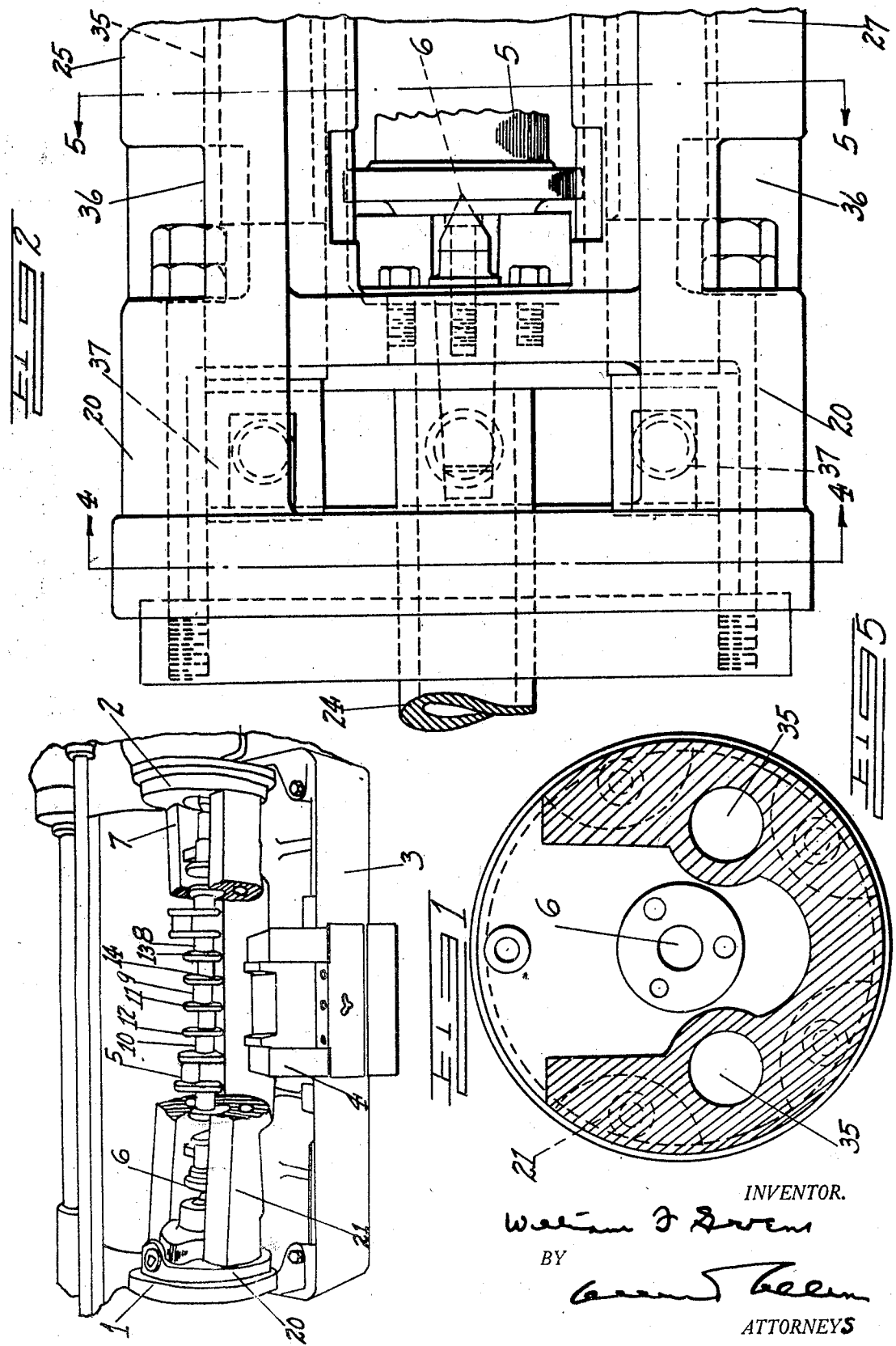
INVENTOR.
William F. Groene
BY
ATTORNEYS

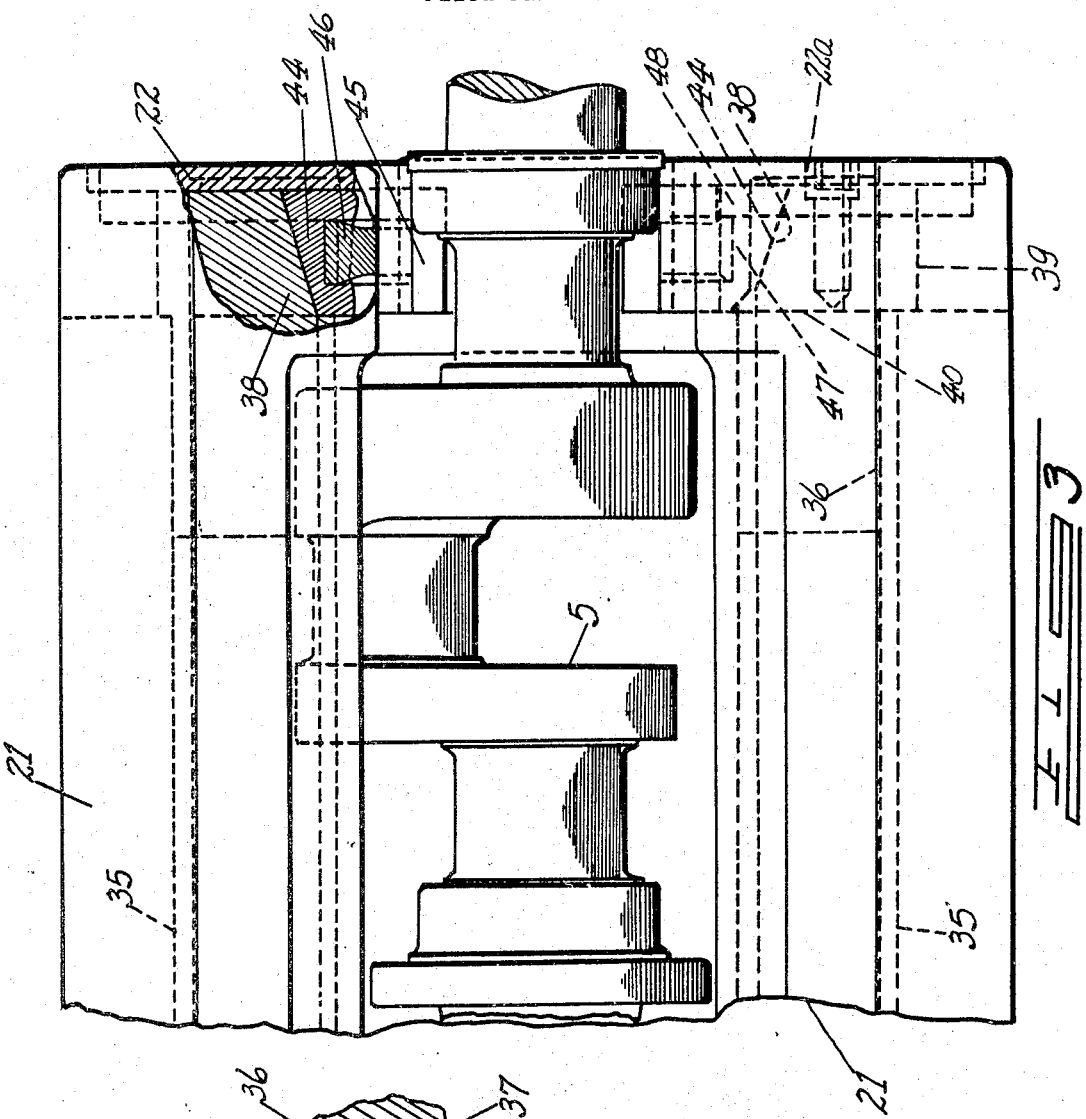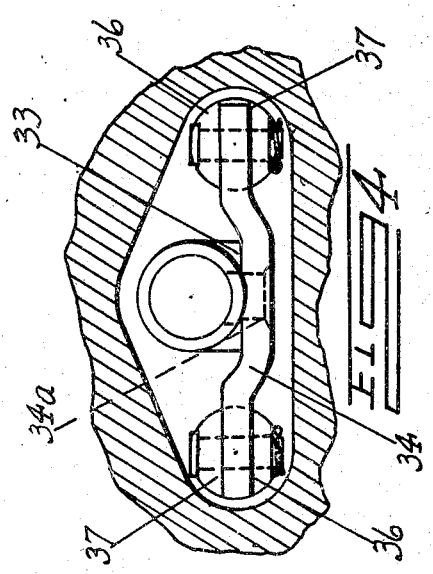

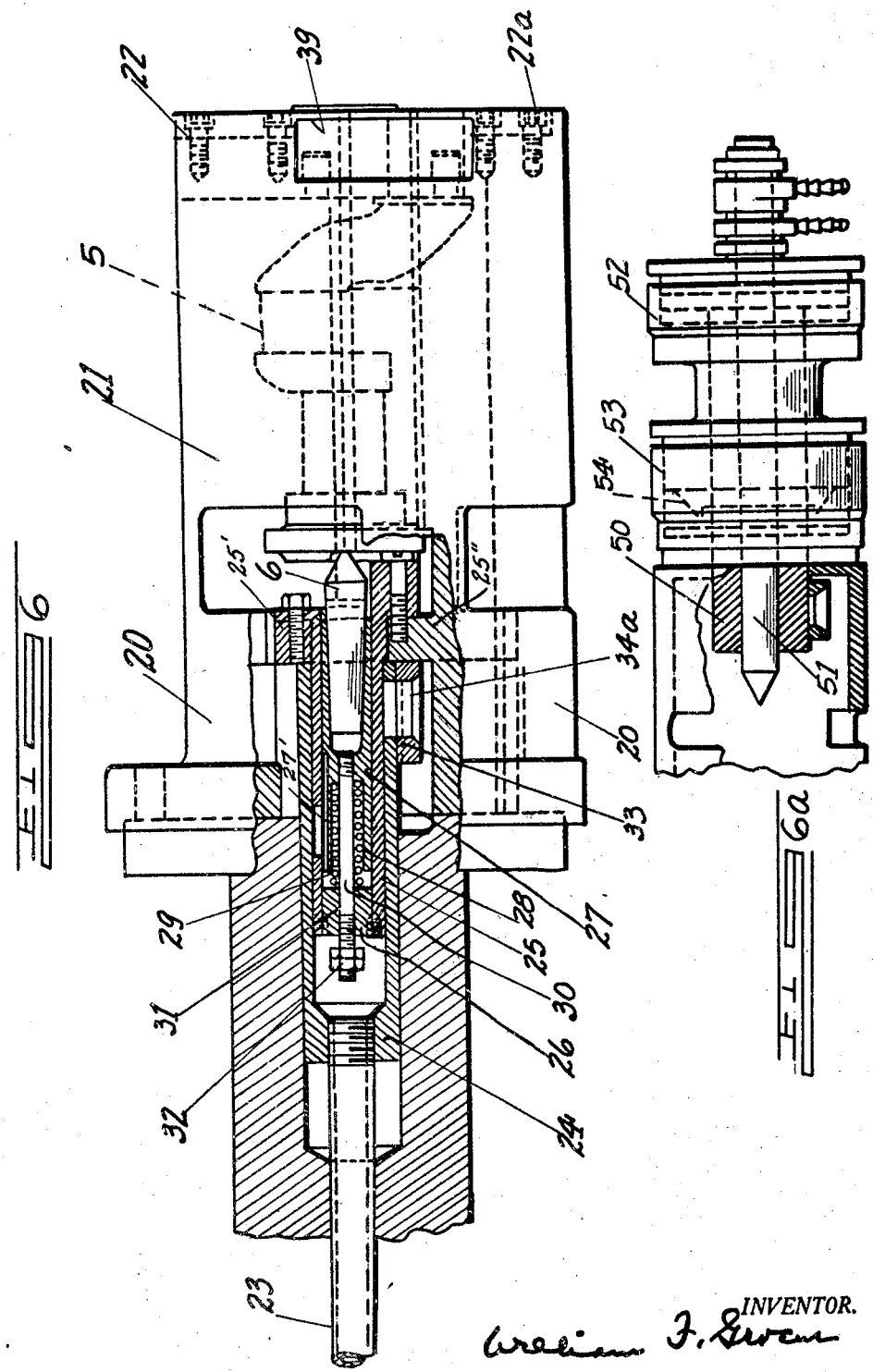

Sept. 20, 1932.  W. F. GROENE  1,878,131
CRANK SHAFT LATHE
Filed Jan. 6, 1927  5 Sheets-Sheet 4
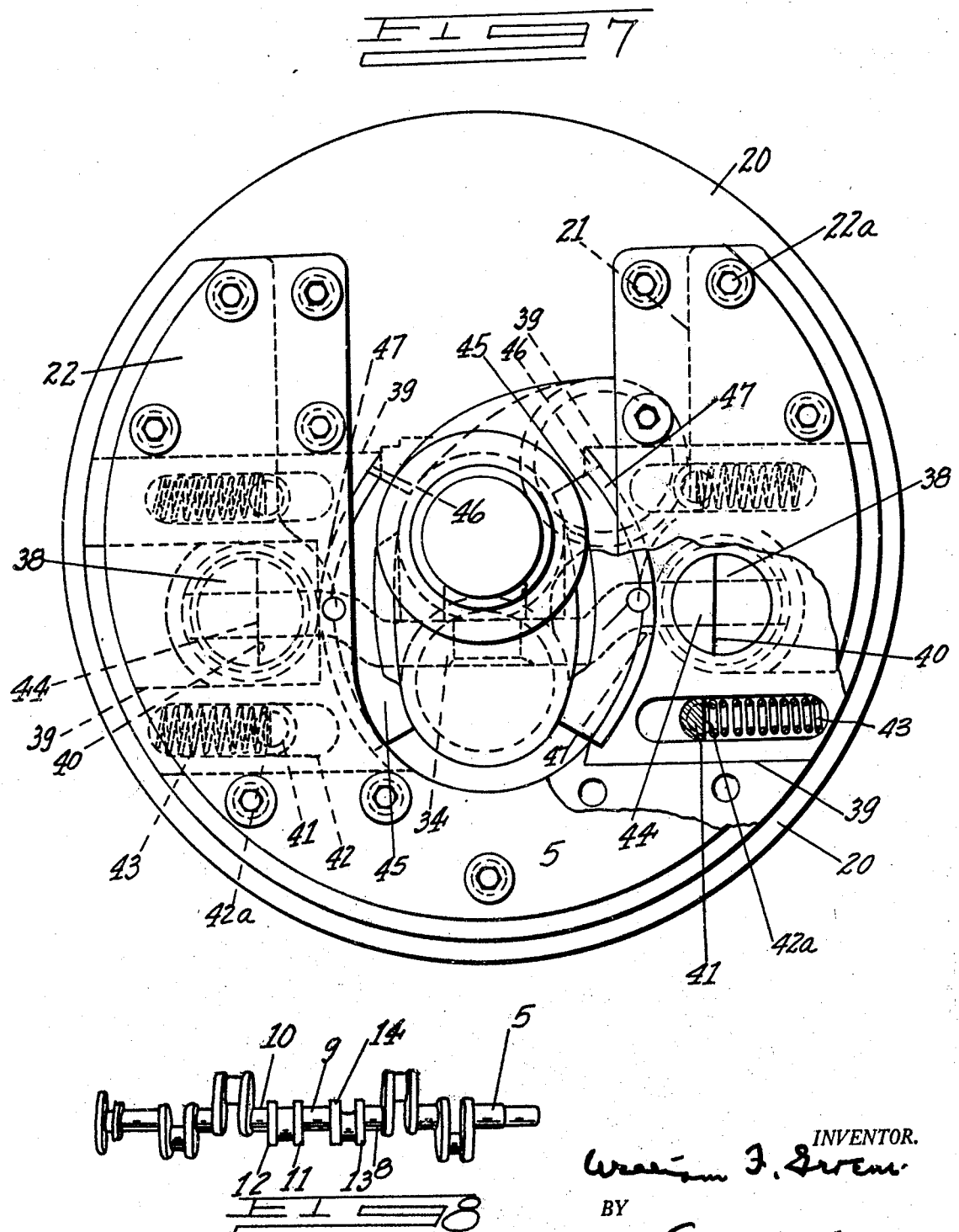

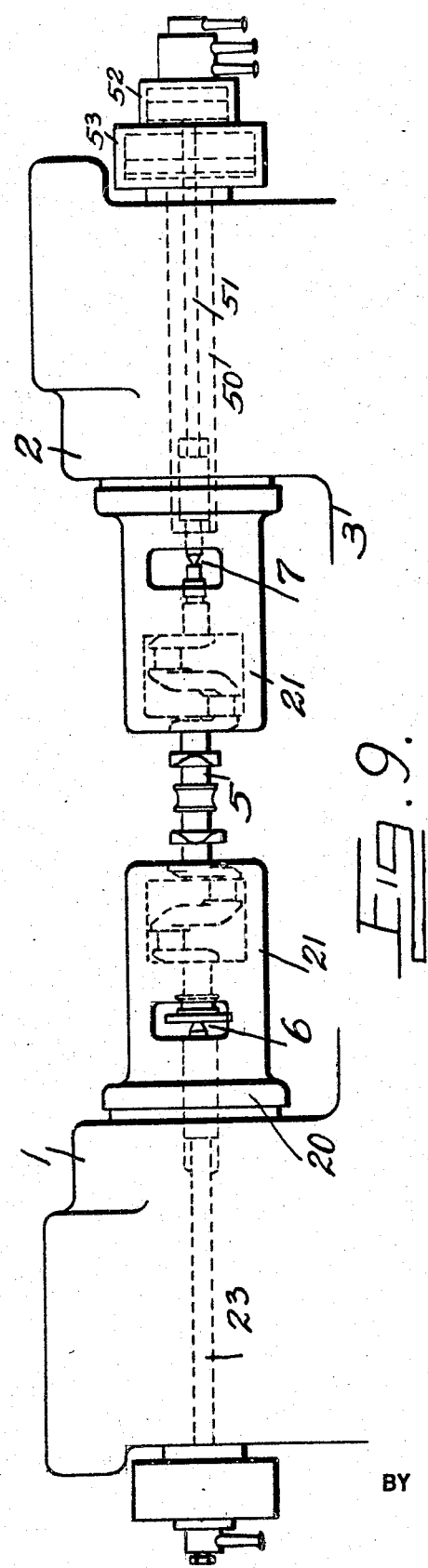

Patented Sept. 20, 1932

1,878,131

UNITED STATES PATENT OFFICE

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE

CRANK SHAFT LATHE

Application filed January 6, 1927. Serial No. 159,448.

My invention relates to chucks for crank shaft lathes, whereby in a pneumatic or power operated chucking device, a crank shaft may be centered, and gripped at a selected cheek away from the centered portion, so as to rotate the crank with relation to a cutting tool, in such a way as to cut the intermediate line bearings of the shaft on the same center as the center on which the shaft is to be journaled when in use.

Such a device requires a very particular structure, for the reason that the shaft is centered at its end, and held in place as a preliminary arrangement to chucking it, and the gripping elements of the chuck must take hold in such a way as to prevent slipping of the shaft off center during the exertion of thrust against it while doing work thereon, and yet the gripping, operated automatically, must take place without throwing the shaft off center.

Such an operation, as operated by air or liquid pressure, for example, must be fully equalized or compensated in the chuck and its operating members, so that irregularities of shape of the cheek of the crank shaft that is gripped will not result in the gripping elements taking hold unevenly, and not forcing the shaft out of line in order to get a full grip. Yet, this compensation must be so arranged for, that once the chucking jaws are in gripping position on the cheek of the shaft, the compensating devices will no longer operate to permit of their being forced out of center during the machining of the line bearings of the shaft, which is the objective of the machine.

It is my object in the structure to be described herein, to provide for the various factors above noted, in an automatically operating chuck, and this object I accomplish by that certain construction and arrangement of parts of which a typical example will be shown in the drawings and fully described, and claims based on the novelty of which will be hereto appended.

In the drawings:—

Figure 1 is a perspective view of a crank shaft lathe, with the chucking element removed, showing the position of the crank and the general arrangement of parts.

Figure 2 is a plan view of the device at one side of the lathe.

Figure 3 is a continuation of Figure 2, showing the extension of the chucking element and the shaft lying within it, that is to be worked upon.

Figure 4 is a section on the line 4—4 of Figure 2.

Figure 5 is a section on the line 5—5 of Figure 2.

Figure 6 is a side elevation of the device shown in the preceding four figures.

Figure 6a is a plan view showing a different pneumatic power arrangement.

Figure 7 is an elevation taken so as to face the cheek gripping end of the chuck element shown in the preceding views.

Figure 8 is an elevation of a crank shaft showing the journals, pins and cheeks.

Figure 9 is a side elevation showing the complete assembly.

The stocks of the lathe within which the two spindles of the lathe revolve are indicated at 1 and 2, with the intervening frame of the lathe at 3. The tools are located on the rests 4. The crank shaft being worked upon is engaged by devices to be described, which revolves as a whole, one in each stock of the lathe. In the operation involved, which is to form cheek and fillet, and the line bearings of a crank shaft, the crank shaft 5 is mounted at its true center at points 6 and 7, and the operations of the lathe are to act upon the bearings 8, 9 and 10, and the cheeks 11, 12, 13 and 14. It will be noted that the bearings in question are on the same center as the end bearings of the shaft.

Since the two spindle and chuck devices may be the same it will be necessary to describe but one. It is my object, where desirable, to employ a different mode of advancing the centering pins of the spindles, and this difference is illustrated in Figure 6a.

Referring then to the devices of the drawings, the spindle body is indicated generally at 20, with the portion 21 thereof left open along one side, within which opening the shaft being operated upon rests. The cheek gripping devices for chucking the shaft are located in the portion 22 of the spindle.

The operation selected for illustration is pneumatic operation by means of compressed air, in which a single air cylinder is used (Figure 9), which cylinder operates a piston rod 23.

Mounted on the piston rod is the main sleeve 24, which projects into the spindle casing and carries within it the centering pin 6. In order to permit the pin to engage the end of the shaft being operated upon, and give additional movement of the sleeve to set in operation the cheek gripping elements of the chuck, the pin is controlled and operated as follows, which is but one of many expedients which could be adopted.

The sleeve is fitted with an internal bushing 25, with flanges 25' and 25" bolted to the cross wall of the spindle body, terminating at its inner end within the sleeve in a plug 26. The centering pin is driven into a bush 27 splined at 27' within the bush 25, and the bush 27 has a hollow inner end 28 within which is a spring 29. The bush 27 has a shaft portion 30 that extends through the end 28 of the bush, and passes slidably through a hole 31 in the plug 26. It is equipped with nuts 32 to act as a stop against the plug. The spring engages the plug, and is housed within the bushing hollow portion 28. Thus, when the main sleeve 24 is thrust inwardly, following the movement of whatever device is used to operate it, the centering pin will engage the shaft being worked upon, and the spring 29 will compress while the sleeve is being moved further to effect the desired clamping action on the shaft, whereby said shaft is revolved.

As indicated most clearly in Figure 4, the main sleeve is formed with a boss 33, within which is mounted a pivot stud 34a. Arranged so as to pivot on this stud is a cross head 34, which acts as an equalizer, as in compensating chucks which have long been well known.

The body of the spindle is formed with journal holes 35, 35, for two sliding rods 36, 36. The rods are forked at their ends as at 37, and are pivoted to the opposite ends of the cross head 34.

At the outer end of the spindle, where the cheek 11 in the present illustration will be found, the two rods terminate in wedges or inclined planes 38, 38. Supported slidably within the end 22 of the spindle body (Fig. 6), are a pair of blocks 39, 39, which are bored with holes 40, 40, through which the wedge ends of the two rods pass.

The end 22 of the spindle is bolted in place as at 22a, leaving the cavities for the two blocks as indicated, and pins 41 are arranged so as to pass through the slots 42, 42, in each block. These pins have flat faces, as indicated at 42a, against which bears the springs 43, which engage the outer walls of the slots. These springs thus tend to force the blocks outwardly.

The holes in the blocks through which the operating rods pass are formed with the same outline as the rods, and with the beveled or wedge faces 44 to be actuated by the opposed like faces on the ends of the rods.

The blocks carry the gripping jaws, which are in the illustrated embodiment formed as curved double contact gripping jaws 45, 45, one for each block. The blocks are provided with curved dovetail slots within which the dovetails 46 on each jaw will slide. In order to limit the sliding movement, the jaws have a cavity in the dovetails thereof, as at 47, and a pin 48 is driven through the slots of the two blocks to act as a stop against the walls of these cavities.

As illustrated, the two jaws grip the cheek 11 of the shaft at four points, and the equalizing features of the structure will be pointed out in the following description of operation.

Considering the shaft to have been placed by the operator so that the centering pins will engage it at its exact journaling center, and with the axial location determined by the extensions 25" engaging the shaft ends, the air or other power will be applied, which will first force the centering pins against the ends of the shaft, so as to hold it in truly centered relation. The continued application of power, considering one of the chucking devices, will continue to move the bush 25 against the pressure of the spring 28, and thus will impart movement to the pivot center of the cross head, which will set into sliding motion the wedge rods. The movement of the cross head on its center will equalize the movements of the two rods, so that equal force is applied to each independent of the extent of movement of each other within the ranges called for by such a machine as the one in question.

The wedges will push inwardly the two blocks, causing the gripping jaws to begin to engage the cheek of the crank shaft or "work." As the engagement of the jaws becomes tighter, due to the wedging movement on the blocks, the jaws will slide in their dovetails to reach a position where both contact faces of each jaw has a grip of equal pressure on the cheek of the shaft. This is the second compensating or equalizing function of the device.

The parts are so arranged that the compensating actions at the cross head and at the jaws will take place without forcing the shaft out of its position as held by the two centering pins.

The action of the wedges is such that the frictional opposition to a retractile movement will be such as to prevent any compensating or equalizing action of the chucking elements, while the work is being acted upon. In fact all of the equalizing action takes place before the ultimate pressure is applied to the cheek of the shaft, and the grip of the jaws will be held by the wedges without any chance for the jaws to slip or the equalizer bar or cross head to rock, while the work is being cut, faced, filleted, etc.

To withdraw the grip of the chuck and remove the shaft when the work is finished, the piston sleeve element is withdrawn by power, which will move the wedges away from the blocks by retraction of the wedge rods. The springs will then force the blocks to a position to lift the jaws away from the work, so that it can be removed. The pressure on the centering pins will also be removed and the spring action on the pins 41 will hold the shaft against dropping down until the operator desires to lift it out.

Instead of having both centering pins operated by a spring release structure, as now described, one or both ends of the lathe may be equipped with two air cylinders. In this case, the main sleeve as shown at 50 (Fig. 6a) will have the shaft or rod 51 of the centering pin passing back through it. The two air cylinders 52 and 53 will be used, in the former of which contains the piston for the centering pin rod, and the latter of which contains the piston 54 for the sleeve. The rod passes clear through the one air cylinder, the sleeve being the journal therefor, so far as it goes.

Other than as noted above, the structure and operation of both spindles of the lathe will be the same.

Air cylinder devices for operating machine tool parts are purchasable as a commodity on the market, and need not be illustrated. The tools, the complete rests and the like, need be no different from those now in use in crank shaft lathes.

The equalizing device applied to the gripping jaws is merely the preferred form, as some type of pivot for the jaws might serve the purpose about as adequately, as will be evident without a detailed description.

The use of a wedge operator is an important feature, as it eliminates the tendency of the compensating action of the chuck taking place during the application of force to the work, after it is being acted upon.

The mode of revolving the entire spindle and chuck assembly requires no description, as this will be according to usual practice.

I have described my device as applied to a six pin crank shaft, and it will be evident without remark, that the structures shown can be modified to take care of other work, wherein the desired function of tightly gripping the shaft on some surface which is not necessarily a true one, without disturbing a previously centered arrangement, is a desideratum.

Having thus described my invention what I claim as new and desire to secure by Letters Patent is:—

1. In a crank shaft lathe, the combination in a spindle of a centering element for engaging the end of a shaft being operated upon to hold it at its true journal center, and a cheek gripping device, including jaws, to engage the shaft at a point away from the centering element, and including a compensating power means movable relatively to said centering element and arranged to compensate both for the movements of the jaws as a whole toward the shaft, and for the position of the jaws with relation to the shaft.

2. In a crank shaft lathe, the combination in a spindle of a centering element for engaging the end of a shaft being operated upon to hold it at its true journal center, and a cheek gripping device, including jaws, to engage the shaft at a point away from the centering element, and compensating means in said cheek gripping device movable relatively to said centering element and arranged to compensate both for the movements of the jaws as a whole toward the shaft, and for the position of the jaws with relation to the shaft, said gripping device including as an element to move the jaws as a whole, a wedge and slide whereby once the movement of the jaws as a whole is completed, the friction will prevent a further compensating action during operations on the work.

3. In a crank shaft lathe, the combination of a pair of spindles, a centering element for each spindle to engage the shaft at its true center, a reciprocating member for each spindle arranged to operate a chucking or work gripping element, a chucking element operated thereby, said reciprocating member for one of the spindles arranged to apply spring pressure against the centering element for that spindle, and the centering element for the other spindle having an independent operating member.

4. In a crank shaft lathe, a chucking element, comprising a body portion through which a shaft to be chucked will pass, a sliding block in said body portion, means for advancing said block and retracting the same, and a gripping jaw on the block, said jaw having a slidable connection with the block, so that it can move to different positions therein, thereby adjusting itself to the contour of the work.

5. In a crank shaft lathe, a chucking element, comprising a body portion through which a shaft to be chucked will pass, a plurality of sliding blocks, wedges for advancing the blocks toward the work, and gripping jaws on the block to engage the work, and mounting means for the jaws, whereby they may alter their position relative to the jaws to adjust for irregularities in shape of the work.

6. In a crank shaft lathe, the combination of two opposed spindles, centering devices for each spindle and chucking devices for each spindle, pneumatic operating devices for said centering and chucking devices, for one of the spindles a single pneumatically moved element having spring means for operating the centering device and means for operating the chucking device, and for the other of the spindles a pair of pneumatically moved elements, one connected to operate the centering device, and one connected to operate the chucking device.

7. In a crank shaft lathe, the combination of two opposed spindles, centering devices for each spindle, chucking devices for each spindle, power pistons for each spindle, compensating connections from said power pistons to the chucking devices for each spindle to operate the same, connections from a power piston for one of the spindles to operate the centering device thereof, and a spring in the other spindle tending to hold its centering device in advanced position relative to its compensating connection.

8. In a crank shaft lathe, a chucking element, comprising a body portion through which a shaft to be chucked will pass, a sliding block in said body portion, means for advancing said block and retracting the same, and a gripping jaw on the block, said jaw having a curved slidable connection with the block, and having gripping contact surfaces spaced in the direction of curvature of the slidable connection, so that it can move to different positions therein, thereby adjusting itself to the contour of the work.

WILLIAM F. GROENE.